July 2, 1957    F. W. GOODWIN    2,797,633
BARBECUE BRAZIER
Filed Nov. 14, 1955
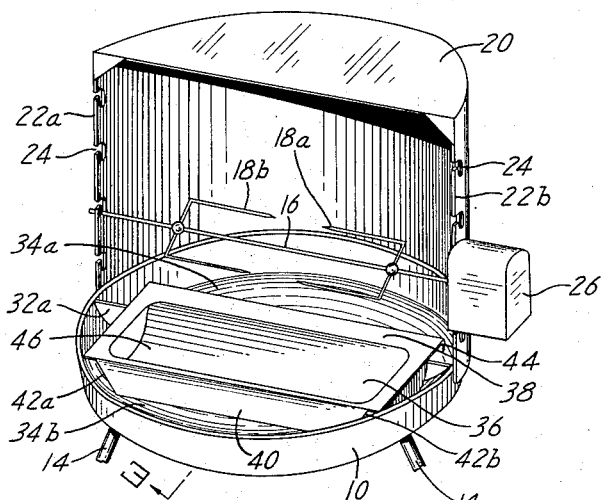
FIG.1.
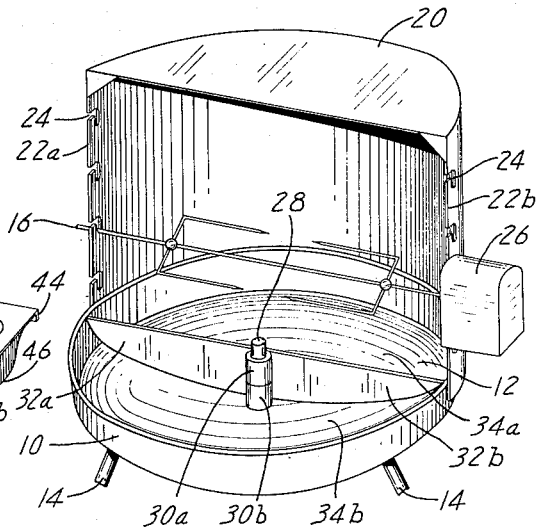
FIG.2.
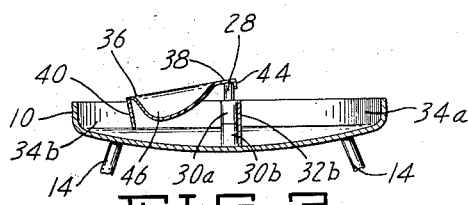
FIG.3.
INVENTOR.
Fred W. Goodwin.
BY
Patent Agent.

though a brazier with rotary blades makes up a preferred embodiment, it being understood that any other means may be employed to divide the fire bowl into a plurality of compartments and to establish a fuel bed in any selected one thereof.

2,797,633

BARBECUE BRAZIER

Fred W. Goodwin, Orinda, Calif.

Application November 14, 1955, Serial No. 546,668

5 Claims. (Cl. 99—421)

The present invention relates to barbecue braziers. More particularly the present invention relates to barbecue braziers of the type provided with spits that are rotatably supported above the fuel bed in the fire bowl of the brazier.

When cooking meat on spits, in braziers of the type referred to, the fat and other juices exuding from the meat drip onto the fire bed and are lost and frequently cause fire flare-ups. Such fire flare-ups may excessively char the meat and furthermore they constitute a fire hazard so that the brazier must be constantly watched during the cooking process to douse the fire whenever necessary.

It is an object of my invention to provide a barbecue brazier wherein the danger of fire flare-ups due to drippings from barbecued meat is prevented, or at least substantially reduced.

Another object of my invention is to provide means, for use in combination with barbecue braziers of the type referred to, for saving the fat and other juices that drip from the barbecued meat during the cooking process, for use in basting or for the preparation of gravies and sauces.

These and other objects of my invention will be apparent from the accompanying drawing which illustrates a preferred embodiment thereof and wherein Figure 1 is a somewhat schematic fragmentary perspective of a barbecue brazier embodying my invention;

Figure 2 is a perspective similar to Figure 1 with a part of the brazier lifted out of the fire bowl thereof to expose structure underneath;

Figure 3 is a cross section through the fire bowl of the brazier.

The barbecue brazier of the invention illustrated in the accompanying drawings comprises a fire bowl 10 which may be of hemispherical or hemispheroidal shape. During operation of the brazier a fuel bed of charcoal or the like is established within the bowl 10 as indicated at 12 in Figure 2. The fire bowl 10 is usually supported upon an appropriate pedestal which is indicated at 14, and suitably supported at a selected level above the fuel bed in bowl 10 is a spit or skewer 16 which may be provided with adjustable tines or prongs 18a and 18b for securely retaining a joint of meat thereon in such a manner that it will participate in the rotation of the spit. In the particular embodiment of the invention illustrated in the accompanying drawing the support for the spit is formed by a semi-cylindrical wind-protector hood 20 that is mounted upon the edge of the fire bowl and whose vertical edges 22a and 22b are provided with a plurality of vertically superposed, horizontally aligned recesses 24 of L-shaped conformation wherein the opposite ends of the spit are received. To turn the spit during the cooking operation, its blunt end may be provided with a crank handle (not shown) or it may be coupled to the drive shaft of a suitable electric motor 26 that is held against rotation in any conventional manner such as by means of a knob (not shown) that engages a higher or lower one of the L-shaped recesses 24 in the adjacent edge 22b of the hood 20.

Rising centrally from the bottom of the fire bowl 10 at the concave side thereof is a cylindrical boss 28 over which are rotatably engaged the looped ends 30a and 30b of two rotary partitioning blades 32a and 32b respectively. These blades serve to divide the concavity of the fire bowl into separate compartments of selected size so that it is possible to establish within the fire bowl two fuel beds of different depth and hence of different heat intensity, or to economize in fuel when less than the full capacity of the fire bowl is needed for cooking, by building a fuel bed in only one of the two compartments. In the exemplary illustration of the present invention shown in Figures 1 and 2 the rotary blades 32a and 32b are adjusted to form an angle of 180 degrees so that the fire bowl is actually divided into two compartments of equal size, and a fuel bed is established only in the rear compartment 34a under the hood 20.

Loosely positioned within the empty compartment 34b is a shallow elongated pan or tray 36 of substantially rectangular conformation. Along its elongated inner edge said tray forms a relatively wide, outwardly bent, horizontal flange 38 that is disposed parallel to and projects into the space underneath the spit 16 and which bears against the top of the cylindrical boss 28 in such a manner that the tray is somewhat tilted in an outward direction (Figure 3) and rests upon the arched inner surface of the fire bowl with a downwardly bent lip 40 which is formed along its opposite elongated edge. The side edges of said lip 40 may be designed to slant inwardly as shown at 42a and 42b. To retain the tray in the defined position its flange 38 may be provided with a downwardly directed narrow rim 44.

In practical use, a joint of meat or the like is impaled upon the spit 16 and held in position by the tines 18a and 18b, and the motor is set in operation in such a manner that it turns the spit in clockwise direction as viewed from the blunt end of the spit where the motor is located. In this manner the bottom sector of the spit and hence the bottom sector of the joint impaled thereon turns toward, and rises on the side of, the tray 36 and as a result thereof when fat and other juices exude from the meat under the influence of the heat produced by the fuel bed in the rear compartment 34a, the momentum imparted to them by the rotation of the spit and their natural tendency to adhere to the meat as long as possible causes them to drip into the cavity 46 of the tray 36, or at least onto the flange 38 thereof from where they flow into the cavity of the tray. Thus, the juices gather in the tray 36 instead of being lost as was previously the case, so that they may be used for basting or in the preparation of gravies and sauces, and while the meat on the spit is fully exposed to the heat of the fuel bed in the rear compartment 34a, practically none of the fat drips into the fuel bed so that the danger of fire flare-ups is greatly minimized. To increase the space wherein the meat juices may accumulate in the tray when the latter is in the tilted position illustrated in Figure 3, said tray is preferably of such cross-sectional conformation that its cavity increases in depth toward the side adjacent its lip 40, as best shown in said Figure 3.

While I have explained my invention with the aid of a particular embodiment thereof, it will be understood that the invention is not limited to the specific constructional details shown and described which may be departed from without departing from the spirit and scope of my invention. Thus, while I have illustrated my invention as applied to a brazier of the type employing rotary partitioning blades to define within the fire bowl a fuel bed of predetermined size, my invention is equally applicable to ordinary braziers without such partitioning blades. In such a case the flange 38 of the tray 36 is simply placed against the boss 28 or some other protrusion in the center of the fire bowl, and the fuel bed may be banked up behind the tray. Alternatively the tray may rest upon a shallow fuel bed which is intended to keep the meat juices hot, while the meat on the spit is exposed to the heat of a fuel bed of greater depth that may be formed behind the tray.

What I claim is:

1. In combination, a fire bowl adapted to hold a fuel bed and having a supporting member at about its center, a spit rotatably supported above said fire bowl in a position extending across said bowl, and a tray of a capacity substantially less than said fire bowl and having a flange of substantial width extending along one of its edges, said tray being situated within said fire bowl with its flange bearing upon said supporting member and extending below and substantially parallel to said spit.

2. In combination, a fire bowl adapted to hold a fuel bed and having a supporting member at about its center, a spit rotatably supported above said bowl in a position extending across said bowl, and a tray having a horizontal flange of substantial width formed along one of its edges and a downwardly bent lip formed along an opposite edge, said tray being situated within said fire bowl with its lip resting upon the floor of said bowl and its flange bearing upon said supporting member and extending below and substantially parallel to said spit.

3. In combination, a fire bowl adapted to hold a fuel bed and having a supporting member at about its center, a spit rotatably supported above said bowl in a position extending across said bowl, and an elongated rectangular tray having a horizontal flange of substantial width formed along one of its long edges and a downwardly bent lip of greater depth than the tray itself formed along the opposite one of its long edges, said tray being situated within said fire bowl with its lip resting upon the floor of said bowl and its flange bearing upon said supporting member and extending below and substantially parallel to said spit.

4. In combination, a fire bowl adapted to hold a fuel bed and having a supporting member at about its center, a spit rotatably supported above said bowl in a position extending diagonally across said bowl, an elongated rectangular tray having a horizontal flange of substantial width formed along one of its long edges and a downwardly bent lip of greater depth than the tray itself formed along the opposite one of its long edges, said tray being situated within said fire bowl with its lip resting upon the floor of said bowl and its flange bearing upon said supporting member and extending below and substantially parallel to said spit, and means for turning said spit in such a manner that the bottom sector thereof rises on the side of said tray.

5. In combination, a fire bowl having a boss rising from its center at the concave side thereof, partitioning blades mounted upon said boss for dividing the concavity of said bowl into separate compartments each adapted to hold a fuel bed, a spit rotatably supported above said bowl in a position extending across said bowl, an elongated substantially rectangular tray having a horizontal flange of substantial width formed along one of its long edges and a downwardly turned lip of greater depth than the tray itself formed along the other of its long edges, said tray being positioned within one of the compartments of said fire bowl with its lip resting upon the floor thereof and its flange bearing upon said boss and extending below and substantially parallel to said spit, and means for turning said spit in such a manner that the bottom sector thereof rises on the side of said tray.

References Cited in the file of this patent

UNITED STATES PATENTS

| 640,305 | Lynch | Jan. 2, 1900 |
| 2,122,780 | Peyton | July 5, 1938 |

FOREIGN PATENTS

| 572,816 | Germany | Aug. 14, 1931 |